United States Patent [19]
Barrett

[11] Patent Number: 5,949,085
[45] Date of Patent: *Sep. 7, 1999

[54] RATIOMETRIC COMPENSATED OPTICAL ISOLATION COUPLER

[75] Inventor: Donald C. Barrett, Camarillo, Calif.

[73] Assignee: Xircom, Inc., Thousand Oaks, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,758

[22] Filed: Jan. 29, 1997

[51] Int. Cl.$^6$ ................................................ G02B 27/00
[52] U.S. Cl. .......................................... 250/551; 327/514
[58] Field of Search .......................... 250/551; 327/514; 359/160, 180, 161

[56] References Cited

U.S. PATENT DOCUMENTS

| 4,190,747 | 2/1980 | Feiner et al. | 179/170 NC |
|---|---|---|---|
| 4,580,293 | 4/1986 | Reichle | 327/514 |
| 4,709,154 | 11/1987 | Rademaker et al. | 250/551 |
| 4,819,241 | 4/1989 | Nagano | 327/514 |
| 4,952,820 | 8/1990 | Frisch | 327/514 |
| 5,373,384 | 12/1994 | Hebert | 327/514 |

FOREIGN PATENT DOCUMENTS

| 0173387 | 3/1986 | European Pat. Off. . |
|---|---|---|
| 55-102940 | 10/1980 | Japan . |

*Primary Examiner*—Stephone Allen
*Attorney, Agent, or Firm*—Loeb & Loeb LLP

[57] ABSTRACT

An improved opto-isolator circuit is disclosed. A fixed bias current is induced through a photoemitter of the opto-isolator. A fixed DC voltage is fixed across the sensor of the opto-isolator, whereby any unknown scaling factor in the opto-isolator is substantially eliminated. In a low frequency embodiment, a passive bridge is used while in a high frequency embodiment, an active bridge circuit is used.

107 Claims, 4 Drawing Sheets

RATIOMETRIC COMPENSATED OPTICAL ISOLATION COUPLER

BACKGROUND OF THE INVENTION

This invention relates to opto-couplers and opto-transformers and more particularly relates to opto-couplers having a gain associated with the optical coupler.

DESCRIPTION OF THE PRIOR ART

With the development of small form factor modems and line terminals for use particularly in association with notebook and subnotebook computers and personal digital assistants (PDA's), it has become necessary to miniaturize telephone line couplers. Traditionally, for example, in modems, the coupling circuitry to the telephone line for providing line isolation is comprised of isolation transformers. With the development of PCMCIA form factor modems and ISDN terminals, use of such transformers became impractical as the transformers are too large for the form factor. As a substitute, opto-electrical isolation circuits or so called optical isolation transformers were developed. Optical isolation transformers typically comprise one light emitting diode or other light emitting device optically coupled to a photosensor such as a photodiode or phototransistor preferably contained in a single IC package. On the transmit side of the device, the modulator or circuitry is coupled to the light emitting diode and the telephone line or hybrid circuitry is coupled to the phototransistor or diode. Conversely on the receive side of the device, the interface circuitry is coupled to the light emitting diode and the photodiode or transistor is coupled to the modem circuitry. The opto-transformer comprises both the transmit and receive opto-couplers and associated circuitry.

A problem with conventional opto-couplers such as those described above is that they have a gain associated with them. This gain or scaling varies between couplers and also varies with temperature and aging along with other factors. To compensate for such varying gain compensation, one common technique is to use a feedback network 2 as shown in FIG. 1. In such feedback techniques, each opto-coupler includes one light emitting diode and two light sensitive elements such as two photodiodes or phototransistors for providing the necessary coupling for each half of the duplex channels needed for the opto-transformer. One of the photodiodes or transistors 2 is coupled to the modem or the telephone line as shown in FIG. 1 and the other is coupled to the same circuitry 4 as the light emitting diode. The second photosensitive element in each of these circuits is used for providing feedback to permit compensation for the gain. Since both photosensistive elements are formed on the same die, the gain of both will be the same (or at a predictable ratio to each other). Therefore, by using the second photosensitive element in a feedback circuit with the photodiode 4, gain compensation can be provided.

However, use of such gain compensation techniques has several drawbacks. First, the requirement of the additional element for feedback along with external components for frequency compensation to control the current through the light emitting element increases cost and the space required for the opto-transformer on a printed circuit board. Also, such feedback capable opto-couplers have two extra pins for each additional sensor of the opto-couplers so that the total number of signal pins is typically six. While in conventional circuit boards this may not be a disadvantage, on small form factor devices such as PCMCIA devices, this increased use of space is highly undesirable. In addition, use of such feedback techniques raises noise problems for higher frequency telephony circuits and networks frequency compensation problems. For example, using XDSL lines operating at speeds of greater than 1 MHz, several external capacitors and inductors may be needed to keep the circuit stable. In addition, the phototransistors have a large Miller capacitance that may cause problems with high frequency operation. Also, external components increase noise problems and require additional space on small form factor circuits. Still further, such circuits are prone to having a variable response to temperature.

Therefore, it is a first object of the invention to provide gain compensation of an opto-coupler without a second photosensor for a feedback circuit. It is a second object of the invention to provide such frequency compensation without increasing the amount of space required on the printed circuit board to permit use of a gain compensated opto-coupler transformer in small form factors. It is a third object to reduce the number of components and therefore the cost. It is yet a fourth object of the invention to provide such opto-isolation without requiring additional components and use conventional technologies. It is yet an additional object of the invention to provide such opto-isolation with feed-forward compensation. It is yet a fifth object to provide such opto-isolation with a broad bandwidth and it is yet a sixth object to provide such opto-isiolation with extra low voltage power supplies.

SUMMARY OF THE INVENTION

These and other objects are achieved by embodiments of the invention using a opto-coupler comprising a light source optically coupled to a photosensor along with a half bridge embodiment to provide ratiometric compensation for the gain of an opto-isolator controllable conductance. In particular, a light emitting diode is supplied with a known reference current and the effective conductance of the detector circuit is leveled with respect to a fixed bias voltage. The known current bias is fed forward to the detector transistor or diode and is referenced to the bias voltage.

In a low frequency embodiment such as is suitable for conventional modems, a passive half bridge embodiment may be used. A fixed reference DC current is provided to the light emitting diode. A phototransistor is optically coupled to receive the light from the light emitting diode and is coupled at a node in series between the power supply voltage and ground in series with a variable conductance element such as a FET. The half bridge circuit also comprises a voltage divider providing a reference voltage for the fixed bias voltage. An integrator having a low cut off frequency maintains the DC voltage at the node equal to the DC voltage provided by the voltage divider by controlling the conductance of the variable conductance element. This ratiometrically neutralizes the current transfer ratio of the opto-coupler.

As an alternative for higher frequency circuits such as XDSL, an active half bridge circuit is used with the Miller capacitance of the opto-detector effectively removed from the detector side. The DC and AC voltage at the node between a FET and the photosensor is held constant to provide ratiometric control with a first op amp using a controlled resistive feedback to hold both the AC and DC components of the voltage at the node constant. In a third embodiment for low voltage applications, the output of the phototransistor is coupled through a current mirror to the controlled resistance.

DETAILED DESCRIPTION OF THE INVENTION

Figure 2:
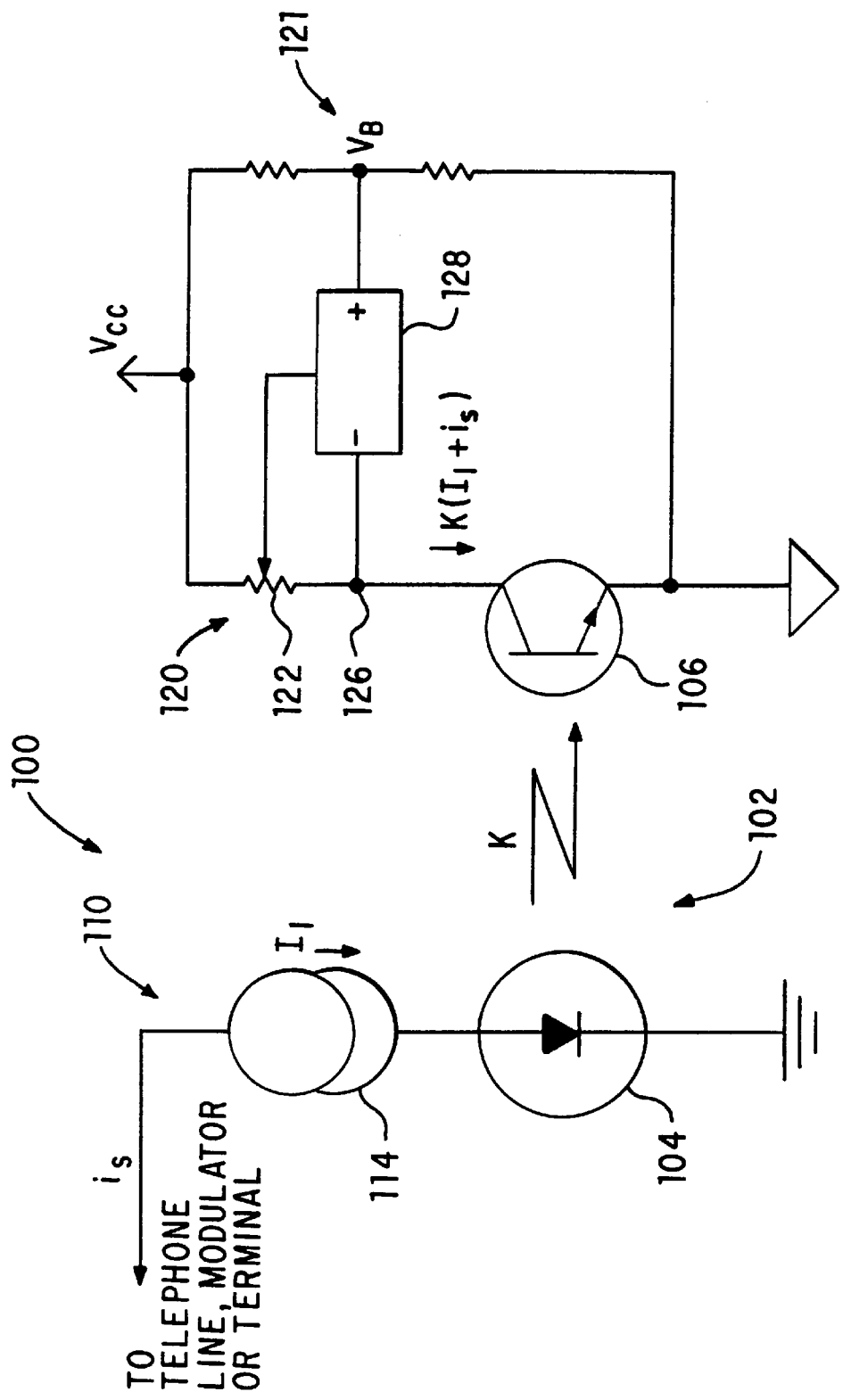
FIG. 2 is a diagram of a first embodiment of the invention for use at frequencies of less than about 20 KHz.

FIG. 2 is a schematic diagram of a first embodiment 100 of the invention. An opto-coupler 102 comprised of a light emitting diode 104 and a phototransistor 106 is used for each half of a duplex channel. The light emitting diode 104 is coupled as part of the primary side 110 of the transformer to a varying current source (not shown) such as the telephone line, the hybrid circuit coupled to the telephone line, or the modulator of a modem. Coupled in series with the voltage source is a fixed current source 114 that provides a known bias current I1. The fixed bias current I1 is added to the AC current $i_s$ from either the modulator or the telephone line and the combined currents flow through the light emitting diode 104 causing the light emitting diode 104 to emit light. For small signal currents $i_s$ relative to I1, modulation of the light emitting diode output is proportional to the modulating current $i_s$.

The secondary part 120 of half of the opto-transformer is coupled to the telephone line or the hybrid circuit of the telephone line or the demodulator of the telephone line (not shown). The secondary 120 comprises a phototransistor 106 that is optically coupled by light so that the collector current is the phototrainsistor current (I1+$i_s$) scaled by a current transfer ratio K. The collector of the phototransistor 106 is coupled in series at an output node 126 to a controllable transconductance element 122, which may for example be a field effect transistor operating as a voltage controlled resistor. The transconductance element 122 is preferably coupled to a fixed reference voltage such as $V_{CC}$. A fixed DC bias $V_B$ is also provided such as ½$V_{CC}$ by a voltage divider 121 coupled between $V_{CC}$ and ground. Alternatively, other reference voltage generators such as a temperature compensated band gap generator may be used. Completing the half bridge circuit comprising half of the secondary 120 of the duplex channel opto-transformer is a control element 128, which may preferably be an integrator having an arbitrarily low cutoff frequency such as less than ten hertz (or below the minimum signal frequency of interest). The inverting input of the control element 128 is coupled to the node 126 and the non-inverting input is coupled to the reference voltage $V_B$.

Looking at the DC operation of the circuit 100, the current flowing through the primary side is I1 so that the DC current through the phototransistor is K*I1. The control element 128, which only has a DC gain, controls the conductance of the controllable transconductance element 122 so that the DC voltage at node 126 remains constant. Since the DC bias is a constant across the phototransistor 106, the equivalent resistance of the phototransistor $R_{EQ}$ will be:

$$R_{EQ} = \frac{V_B}{K*I1}$$

Since the AC current through the phototransistor equals K*$i_s$, the AC, voltage across the phototransistor $V_{AC}$ will be equal to K*$i_s$*$R_{eq}$. By substitution, the ratiometric compensation becomes apparent as the variable K drops out with the AC voltage component across the phototransistor being as follows:

$$V_{ac}=i_S*V_B/I1$$

Hence, the output AC voltage at node 126 may be provided through a buffer or other isolation circuitry for further processing by the demodulator portion of the modem (not shown) or for transmission over the telephone line. This output voltage is independent of the current gain of the optical isolator as K is not a term in the AC voltage. Further, because of ratiometric compensation (i.e. $V_B$=½$V_{CC}$), when the voltage divider is used to generate $V_B$, this allows $V_{CC}$ to change without a gain effect. The output voltage can be taken at node 126 through a buffer amplifier or the like.

In an alternative analysis, the opto-transformer has a fixed transconductance of $V_B$/I1 since $V_B$ and I1 are constants. Further, the ratiometric compensation is attained by providing a fixed reference current to the emitter diode and by leveling the conductance of the detector with respect to a fixed bias voltage $V_B$. The current bias $I_1$ at the emitter diode is forward referenced to the bias voltage $V_B$ on the detector transistor, thereby providing feedforward compensation.

However a drawback of the circuit of FIG. 2 is that the frequency response characteristics of the circuit are limited by the Miller capacitance of the phototransistor 106. Therefore, the embodiment of FIG. 2 is limited to signals having a frequency cutoff of about twenty kilohertz such as in V 34 modems.

Figure 3:
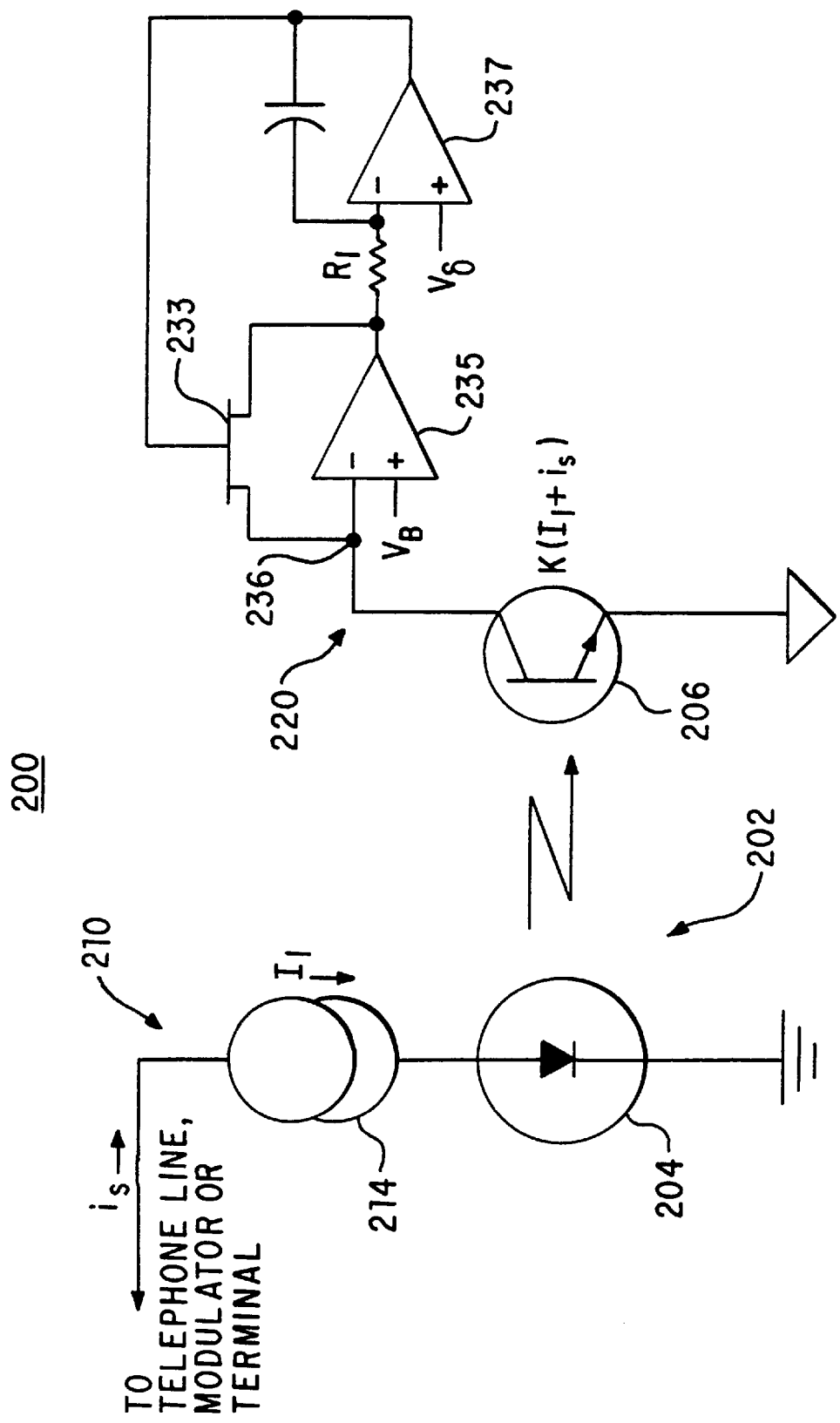
FIG. 3 is a diagram of a second embodiment of the invention for use at higher frequencies.

FIG. 3 shows a second embodiment 200 of the invention for high frequency operation such as in ISDN modems or terminals or XDSL (ADSL or HDSL) modems with like components bearing like numbers as those used in FIG. 2. An optical isolator 202 comprised of a light emitting diode 204 and a phototransistor 206 is used for each half of a duplex channel. The light emitting diode 204 is coupled as part of the primary 210 to a varying source such as the telephone line (not shown) or the modulating circuitry of a terminal or modem to produce a variable current $i_S$. Coupled in series with the variable current is a fixed current source 214 that provides a fixed bias current I1.

The half of a secondary side 220 of the duplex channel opto-transformer comprises a phototransistor 206 that is optically coupled by light so that the collector current is the light emitting diode current scaled by a current transfer ratio K. The collector of the phototransistor 206 is coupled to a drain of JFET 233 and the inverting input of an operational amplifier 235. The output of the amplifier 235 is coupled to the source of the JFET 233 and to a resistor R1. In operation, the JFET 233 acts like a voltage controlled resistor so that the op amp 235 will force the voltage at the inverting input to be equal to $V_B$, a reference voltage applied to the non-inverting input of the amp 235. The resistor R1 is also coupled to the inverting input of the amplifier 237 and the output of amplifier 237 is coupled to the gate of the JFET 233. Amplifier 237 is configured as an integrator or other type of low pass filter and preferably has a cutoff frequency of about ten hertz. Hence amplifier 237 will force the DC voltage at the output of the amplifier 235 to be $V_δ$. The two fixed reference voltages $V_B$ and $V_δ$ are provided by a voltage divider (not shown) permitting $V_{CC}$ to vary without a gain effect or other reference source such as a bandgap voltage generator with a voltage multiplier to generate both $V_δ$ and $V_B$. The two reference voltages are preferably constrained by the following formula:

$$V_δ≈2V_B$$

The first operational amplifier 235 takes the difference between the output of the phototransistor 206 and the bias $V_B$ to provide an AC voltage portion proportional to the AC ($Ki_S$) current through the phototransistor 206. The FET 233 is controlled by the second operational amplifier 237 to impose a DC bias of $V_\delta$ on the output of the first amplifier 233. Since the FET is controlled by the integrator that substantially attenuates the effects of the AC signal components, the DC component added by the FET 233 to the output of the first amplifier keeps that output at substantially equal to $V_\delta$. Further, the DC voltage across the phototransistor is constrained to be equal to $V_B$ as is the voltage drop across the FET 233. As a result, the same ratiometric control as explained above is achieved using two fixed bias voltages in the secondary stage and a fixed bias current in the primary stage.

In addition, the circuit of FIG. 3 has a much wider bandwidth than typical opto-isolation circuits. In the circuit of FIG. 2, at high frequency, the Miller capacitance of the phototransistor 206 degrades high frequency performance, and typically limits bandwidth to twenty kilohertz. However, op amp 235 in the AC domain is configured as a transresistance amplifier and strives to hold node 236 to be equal to $V_B$. As a result, although a variable current ($K*i_2$) passes through the phototransistor 206, the Miller capacitance has no effect (within the open loop gain limits of the amplifier 235). Hence, the output of the op amp 235 can be used as the circuit output, effectively increasing bandwidth to the limit of the junction capacitance of the light emitting diode 204. Thus the overall bandwidth of the opto-transformer is on the order of several megahertz.

It should be noted that the embodiment of FIG. 3, while described with a JFET 233 could also be done with a P- or N-channel MOSFET or JFET. In that event, the coupling to the inverting and the noninverting inputs of the second operational amplifier 237 need to be switched and a small RC network needs to be added in between the output of the second operational amplifier and the control node of the P-channel FET such that the signal voltage is divided by two at the gate.

Figure 4:
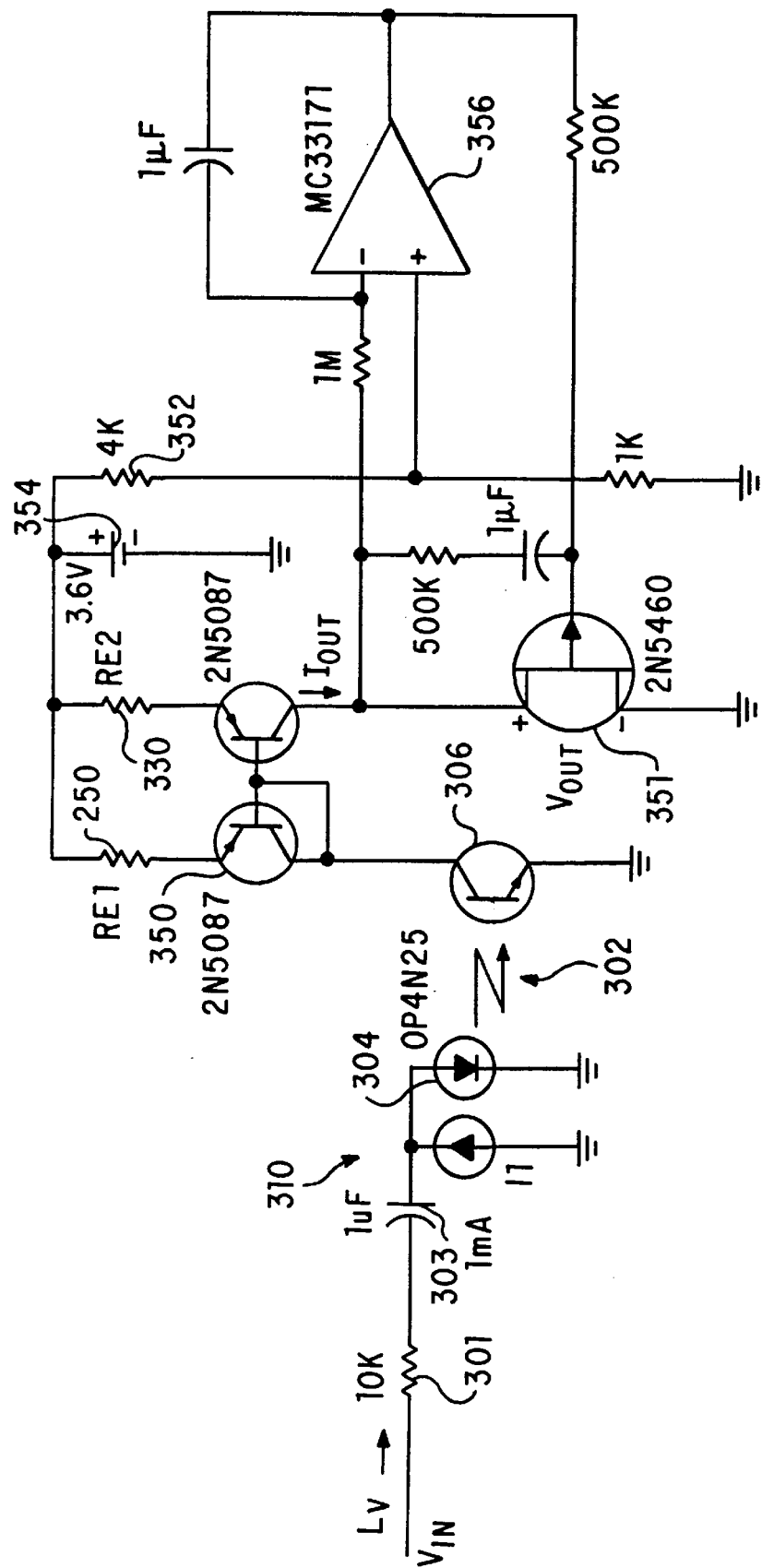
FIG. 4 is a diagram of a third embodiment of the invention for use in low voltage applications

As still a third embodiment 300, particularly for use in low voltage applications is shown in FIG. 4 that also has a broad bandwidth. In the embodiment of FIG. 4, each half of the primary 310 for a duplex channel has a different configuration than in the other embodiments. A voltage drive $V_{IN}$ from the input such as a telephone line or the transmitter drives a series resistor 301 and capacitor 303 forming a high pass filter. A current source provides a constant bias current I1 and is in parallel with the light emitting diode 304 of the opto-coupler 302. The light emitting diode 304 is optically coupled by a gain scaling factor K to the phototransistor 306 of the optical transformer 302 providing a current at the collector equal to $K(I1+i_V)$, where $i_V$ is the current through the light emitting diode 304 in response to the voltage at the input $V_{IN}$.

The induced current $K(I1+i_V)$ flowing through the collector of phototransistor 306 is coupled from an input of a current mirror 350 to provide an output current $I_{OUT}$ proportional to the phototransistor collector current $K(I1+i_V)$. Emitter resistors RE1 and RE2 set the current ratio of the output current to the collector based upon the emitter resistances and the transistor dimensions in the current mirror 350. The output current develops a voltage ($V_{OUT}$) across a voltage controlled resistance 351 and that voltage is compared by an integrator 356 with a reference voltage (here 0.62 volts) developed by a voltage divider 352 from a low voltage source 354 (here 3.6 volts) to permit $V_{CC}$ to vary without a gain effect. That comparison is integrated by an integrator 356 having a low cutoff frequency of about 10 Hz to control the resistance of the JFET 351. Also the AC current is provided to the gate of the JFET 351 to linearize the operation of the JFET with a capacitor providing DC isolation. The output voltage $V_{OUT}$ may be coupled to a phone line or receiver through appropriate buffering.

The embodiment of FIG. 4 permits operation at extremely low voltage. As long as the saturation voltage of transistor 306 is more than $V_{CC}$ minus a $V_{BE}$ plus the voltage drop across RE1, the circuit will be operational. The two emitter resistances RE1 and RE2 in the current mirror can be used for controlling the currents so that the photo transistor 306 is nominally operating at the center of its operational range and for obtaining the particular desired resistance of the PFET. Further, although the bandwidth of the circuit is not as good as the embodiment of FIG. 2, the circuit has a broad bandwidth as the current mirrors strive to hold the voltage at the collector of the photo transistor 306 constant. Further, the circuit still provides the same ratio-less transfer of signal by controlling the equivalent resistance of the phototransistor in the manner described above by adjusting the resistance of the FET with respect to a reference voltage using a low frequency control loop such as integrator 356.

Figure 1:
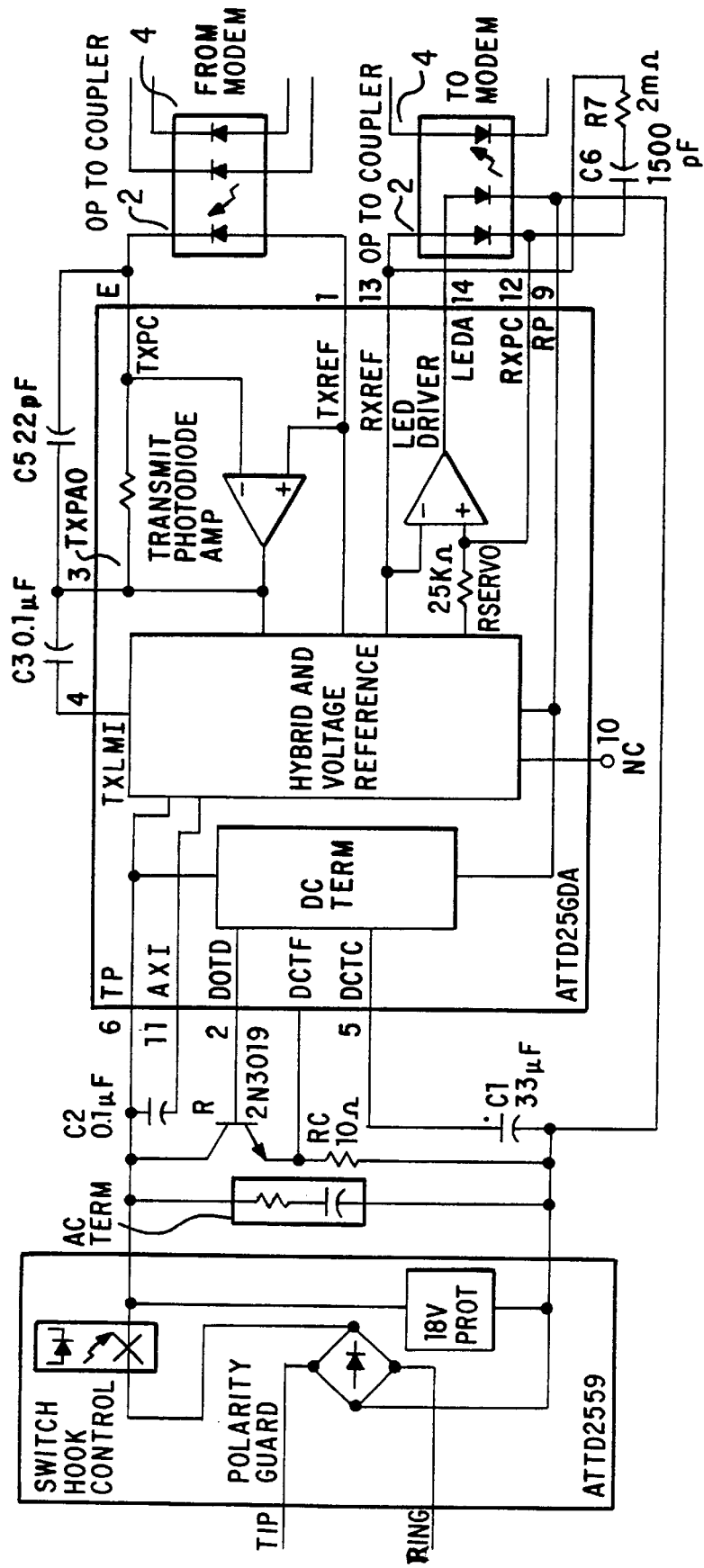
FIG. 1 is a diagram of a prior art opto-electrical transformer as is commonly used in telephony circuits such as modems.

To form an opto-transformer, two circuits 300 such as those in FIG. 4 are used. The input of a first such circuit 300 and the output of another such circuit 300 is coupled to a phone line through appropriate buffering circuitry and the hybrid. The output of the first of such circuit 300 is coupled through the appropriate buffering circuit to the receiver or demodulator of the modem and the input of the other of such circuits 300 is coupled to the output of the transmitter or modulator. This combination provides a full duplex opto-transformer but requires four fewer pins than the prior art circuitry and fewer external components than the prior art circuit of FIG. 1.

Still other embodiments of the circuit would be readily apparent to those of skill in the field. Of course, the use of the opto-transformer need not be limited to telephony applications but could be used in other applications. For example, the primary side 310 of FIG. 4 could be used as the primary side in any of the embodiments of FIG. 1 and FIG. 2. In addition, the ratiometric compensation could be used in other types of isolation couplers where the same or similar problems are encountered. Still further, the entire optotransformer or preferably pairs of the optotransformers could be incorporated in an integrated circuit with the only external components being the capacitors of the integrators. Alternatively, all of the circuitry other than the opto-couplers could be fabricated on one integrated circuit with the opto-couplers on separate integrated circuits to provide better isolation. Therefore, recourse as to the scope of the invention should be had with the claims.

I claim:

1. An opto-isolator circuit for providing a DC isolated output signal in response to a variable input signal comprising:

a primary side including:

a light emitting source emitting light in response to a signal applied to said source; and a fixed bias generator generating a fixed bias signal to be added to the variable input signal for application to said light emitting source; and a secondary side including:

a two-leaded photodetector having an output responsive to said light emitting source for providing an output signal related to said fixed bias signal and the variable input signal by a scaling factor, the magnitude of said scaling factor being variable and wherein said light emitting and said photodetector define a single channel optical coupling;

a reference voltage generator providing a reference voltage; and control circuitry responsive to said reference voltage to ratiometrically compensate for said scaling factor such that said photodetector output is substantially independent of said scaling factor.

2. The circuit of claim 1, wherein said control circuitry includes:

a difference circuit responsive to said photodetector output and said reference voltage to produce an output proportional to the difference between said photodetector output and said reference voltage; and a controllable conductance having a first terminal responsive to said photodetector and a second terminal controlling the conductance responsive to said difference circuit output.

3. The circuit of claim 2, wherein said difference circuit has a cutoff frequency of less than about one hundred hertz.

4. The circuit of claim 2, wherein said difference circuit has a cutoff frequency of less than about ten hertz.

5. The circuit of claim 2, wherein said controllable conductance has a third terminal, said third terminal being held at a reference level greater than said reference voltage.

6. The circuit of claim 1, wherein said primary side is coupled to one of a group consisting of a telephone line and a transmitter and said secondary side is coupled to a group consisting of a telephone line and a receiver.

7. The circuit of claim 1, wherein said light emitting source comprises a light emitting diode and said photodetector comprises a phototransistor.

8. The circuit of claim 1, wherein said control circuitry includes an integrator responsive to said photodetector.

9. The circuit of claim 8, wherein said integrator has a cutoff frequency of less than about ten hertz.

10. The circuit of claim 1, wherein said photodetector operates in a current mode.

11. The circuit of claim 1, wherein said photodetector has a DC level output and said control circuitry comprises:

a first circuit having an input coupled to said photodetector and a first circuit output, said first circuit output being proportional to twice the DC level plus an AC component proportional to the variable input signal; and a second circuit coupled in feedback with said first circuit to control the DC voltage across said first circuit.

12. The circuit of claim 11, wherein said first circuit comprises an operational amplifier having inverting and noninverting inputs along with an output and a FET coupled between said inverting input and sad output and said FET having a control electrode.

13. The circuit of claim 12, wherein said second circuit comprises a low pass filter responsive to said output of said operational amplifier and said control electrode of said FET being responsive to said filter.

14. The circuit of claim 11, wherein said photodetector has an output voltage swing and said first and second circuits have a gain that substantially cancels said output voltage swing of said photodetector, thereby increasing a frequency bandwidth of said opto-isolator circuit.

15. The circuit of claim 11, wherein said control circuitry includes a reference voltage generator providing two reference voltages, a first of said reference voltages being approximately equal to half of a second reference voltage, said first reference voltage being approximately equal to the DC voltage generated across said photodetector, and wherein said first circuit includes a first difference circuit to determine the difference between said first reference voltage and said photodetector output; and said second circuit includes a second difference circuit to provide at said output of said second circuit a signal proportional to the DC difference between said output of said first circuit and said second reference voltage.

16. The circuit of claim 15, wherein said first circuit includes a FET coupled between said input and said output of said first circuit such that said FET adds a DC voltage approximately equal to said second voltage to said output of said first difference circuit.

17. The circuit of claim 11, wherein said second circuit comprises an integrator having a cutoff frequency of about ten hertz.

18. The circuit of claim 1, wherein said control circuit further comprises:

a current mirror having a mirror current input responsive to said output of said photodetector and providing a mirror current output which mirrors the signal provided by said photodetector;

a controllable resistance coupled to said mirror current output;

an integrator responsive to said reference voltage and voltage generated across said controllable resistance to provide said ratiometric compensation.

19. The circuit of claim 18, wherein said current mirror further includes emitter resistances for adjusting a ratio of the current at said input and said output of said current mirror.

20. The circuit of claim 18, wherein said integrator compares a voltage at said output of said current mirror with a fixed reference voltage.

21. The circuit of claim 1, wherein said primary side further comprises an input signal in series with said light emitting source and said bias generator, said bias generator comprising a current source.

22. The circuit of claim 1, wherein said primary side comprises a voltage input coupled in series with a parallel circuit comprised of said bias generator and said light emitting source.

23. A method for providing DC isolation between an input signal having an AC component supplied to a light emitting device and an output signal having a DC component and an AC component supplied by an output of a two-leaded photodetector, said photodetector optically coupled to said light emitting device by a variable scaling factor and defining with said light emitting device a single channel optical coupling, said method comprising:

providing a fixed bias signal to said light emitting device to provide a fixed bias voltage to said photodetector; and controlling said DC component of said output of said photodetector with respect to said fixed bias voltage, wherein said AC component of said output signal varies with said input signal and is substantially independent of the scaling factor.

24. The method of claim 23, wherein the controlling step comprises forcing a fixed DC voltage across said photodetector.

25. The method of claim 24, wherein the forcing of said DC voltage comprises determining the difference between the DC voltage across said photodetector and a fixed voltage.

26. The method of claim 25, wherein said difference controls the conductance of a variable impedance device such that the DC voltage across said photodetector is fixed.

27. The method of claim 23, wherein said method additional comprises:

adding a DC voltage to said photodetector output signal to create a summed voltage at a summed node;

determining the DC voltage difference between said summed voltage and a fixed reference voltage; and controlling the DC voltage to be added to said voltage across said photodetector.

28. The method of claim 23, wherein said photodetector produces an output current, said method further including:

mirroring said current from said photodetector;

providing said mirrored current to a controllable resistance; and controlling the resistance of said controllable resistance such that said current output is substantially independent of the scaling factor.

29. The method of claim 28, wherein said method of controlling said controllable resistance includes comparing a voltage developed across said controllable resistance with a preset voltage and integrating said comparison to set the resistance of said controllable resistance.

30. A circuit for compensating for a variable scaling factor between the coupling of an input energy emitting component responsive to a current and a two-leaded sensor responsive to said energy emitting component, said input energy emitting component and sensor defining a single channel coupling, said circuit comprising:

a fixed bias signal generator inducing a fixed bias current through said energy emitting component; and a circuit coupled to said sensor for fixing the equivalent resistance of said sensor in response to said fixed bias current.

31. The circuit of claim 30, wherein said equivalent resistance is fixed by fixing one of a group consisting of the (1) DC voltage and (2) the AC plus the DC voltage.

32. The circuit of claim 30, wherein said equivalent resistance depends on the scaling factor and said bias current through said equivalent resistance depends on the scaling factor.

33. An opto-isolator circuit for providing a DC isolated output signal in response to a variable input signal comprising:

a primary side including:
a light emitting source emitting light in response to a signal applied to said source; and
a fixed bias generator generating a fixed bias signal to be added to the variable input signal for application to said light emitting source; and a secondary side including:
a phototransistor having a collector terminal for providing an output signal responsive to said light emitting source, said output signal being related to said fixed bias signal and the variable input signal by a scaling factor, the magnitude of said scaling factor being variable and wherein said light emitting source and said phototransistor define a single channel optical coupling;
a reference voltage generator providing a reference voltage; and
control circuitry coupled to said collector terminal, said control circuitry being responsive to said reference voltage to ratiometrically compensate for said scaling factor such that said phototransistor output is substantially independent of said scaling factor.

34. The circuit of claim 33, wherein said control circuitry includes:

a difference circuit responsive to said phototransistor output signal and said reference voltage to produce an output proportional to the difference between said phototransistor output signal and said reference voltage; and a controllable conductance having a first terminal responsive to said phototransistor output signal and a second terminal controlling the conductance responsive to said difference circuit output.

35. The circuit of claim 34, wherein said difference circuit has a cutoff frequency of less than about one hundred hertz.

36. The circuit of claim 34, wherein said difference circuit has a cutoff frequency of less than about ten hertz.

37. The circuit of claim 34, wherein said controllable conductance has a third terminal, said third terminal being held at a reference level greater than said reference voltage.

38. The circuit of claim 33, wherein said primary side is coupled to one of a group consisting of a telephone line and a transmitter and said secondary side is coupled to a group consisting of a telephone line and a receiver.

39. The circuit of claim 33, wherein said light emitting source comprises a light emitting diode.

40. The circuit of claim 33, wherein said control circuitry includes an integrator responsive to said phototransistor output signal.

41. The circuit of claim 40, wherein said integrator has a cutoff frequency of less than about ten hertz.

42. The circuit of claim 33, wherein said phototransistor operates in a current mode.

43. The circuit of claim 33, wherein said phototransistor has a DC level output and said control circuitry comprises:

a first circuit having an input coupled to said phototransistor and a first circuit output, said first circuit output being proportional to twice the DC level plus an AC component proportional to the variable input signal; and a second circuit coupled in feedback with said first circuit to control the DC voltage across said first circuit.

44. The circuit of claim 43, wherein said first circuit comprises an operational amplifier having inverting and noninverting inputs along with an output and a FET coupled between said inverting input and said output and said FET having a control electrode.

45. The circuit of claim 44, wherein said second circuit comprises a low pass filter responsive to said output of said operational amplifier and said control electrode of said FET being responsive to said filters.

46. The direct of claim 43, wherein said phototransistor has an output voltage swing and said first and second circuits have a gain that substantially cancels said output voltage swing of said phototransistor, thereby increasing a frequency bandwidth of said opto-isolator circuit.

47. The circuit of claim 43, wherein said control circuitry includes a reference voltage generator providing two reference voltages, a first of said reference voltages being approximately equal to half of a second reference voltage, said first reference voltage being approximately equal to the DC voltage generated across said phototransistor, and wherein said first circuit includes a first difference circuit to determine the difference between said first reference voltage and said phototransistor output; and said second circuit includes a second difference circuit to provide at said output of said second circuit, a signal proportional to the DC difference between said output of said first circuit and said second reference voltage.

48. The circuit of claim 47, wherein said first circuit includes a FET coupled between said input and said output of said first circuit such that said FET adds a DC voltage approximately equal to said second voltage to said output of said first difference circuit.

49. The circuit of claim 43, wherein said second circuit comprises an integrator having a cutoff frequency of about ten hertz.

50. The circuit of claim 33, wherein said control circuit further comprises:
  a current mirror having a mirror current input responsive to said output of said phototransistor and providing a mirror current output which mirrors the signal provided by said phototransistor;
  a controllable resistance coupled to said mirror current output;
  an integrator responsive to said reference voltage and voltage generated across said controllable resistance to provide said ratiometric compensation.

51. The circuit of claim 50, wherein said current mirror further includes emitter resistances for adjusting a ratio of the current at said input and said output of said current mirror.

52. The circuit of claim 50, wherein said integrator compares a voltage at said output of said current mirror with a fixed reference voltage.

53. The circuit of claim 33, wherein said primary side further comprises an input signal in series with said light emitting source and said bias generator, said bias generator comprising a current source.

54. The circuit of claim 33, wherein said primary side comprises a voltage input coupled in series with a parallel circuit comprised of said bias generator and said light emitting source.

55. A method for providing DC isolation between an input signal having an AC component supplied to a light emitting device and an output signal having a DC component and an AC component supplied by an output of a phototransistor, said phototransistor having a collector terminal for providing said output signal, said phototransistor being optically coupled to said light emitting device by a variable scaling factor and defining with said light emitting device a single channel optical coupling, said method comprising:
  providing a fixed bias signal to said light emitting device to provide a fixed bias voltage to said phototransistor; and
  controlling said DC component of said output of said phototransistor with respect to said fixed bias voltage, wherein said AC component of said output signal varies with said input signal and is substantially independent of the scaling factor.

56. The method of claim 55, wherein the controlling step comprises forcing a fixed DC voltage across said phototransistor.

57. The method of claim 56, wherein the forcing of said DC voltage comprises determining the difference between the DC voltage across said phototransistor and a fixed voltage.

58. The method of claim 57, wherein said difference controls the conductance of a variable impedance device such that the DC voltage across said phototransistor is fixed.

59. The method of claim 55, wherein said method additionally comprises:
  adding a DC voltage to said phototransistor output signal to create a summed voltage at a summed node;
  determining the DC voltage difference between said summed voltage and a fixed reference voltage; and
  controlling the DC voltage to be added to said voltage across said phototransistor.

60. The method of claim 55, wherein said phototransistor produces an output current, said method further including:
  mirroring said current from said phototransistor;
  providing said mirrored current to a controllable resistance; and
  controlling the resistance of said controllable resistance such that said current output is substantially independent of the scaling factor.

61. The method of claim 60, wherein said method of controlling said controllable resistance includes comparing a voltage developed across said controllable resistance with a preset voltage and integrating said comparison to set the resistance of said controllable resistance.

62. A circuit for compensating for a variable scaling factor between the coupling of an input energy emitting component responsive to a current and a phototransistor including a collector terminal, said phototransistor being responsive to said energy emitting component and defining with said energy emitting component a single channel coupling, said circuit comprising:
  a fixed bias signal generator inducing a fixed bias current through said energy emitting component; and
  a circuit coupled to said collector terminal of said phototransistor for fixing the equivalent resistance of said phototransistor in response to said fixed bias current.

63. The circuit of claim 62, wherein said equivalent resistance is fixed by fixing one of a group consisting of the (1) DC voltage and (2) the AC plus the DC voltage.

64. The circuit of claim 62, wherein said equivalent resistance depends on the scaling factor and said bias current through said equivalent resistance depends on the scaling factor.

65. An opto-isolator circuit for providing a DC isolated output signal in response to a variable input signal comprising:
  a primary side including:
    a light emitting source emitting light in response to a signal applied to said source; and
    a fixed bias generator generating a fixed bias signal to be added to the variable input signal for application to said light emitting source; and
  a secondary side including:
    a two-leaded photodetector having an output responsive to said light emitting source for providing an output signal related to said fixed bias signal and the variable input signal by a scaling factor, the magnitude of said scaling factor being variable;
    a reference voltage generator providing a reference voltage; and
    control circuitry responsive to said reference voltage to ratiometrically compensate for said scaling factor such that said photodetector output is substantially independent of said scaling factor, said control circuitry including a difference circuit responsive to said photodetector output and said reference voltage to produce an output proportional to the difference between said photodetector output and said reference voltage and a controllable conductance having a first terminal responsive to said photodetector and a second terminal controlling the conductance responsive to said difference circuit output, and wherein said difference circuit has a cutoff frequency of less than about one hundred hertz.

66. An opto-isolator circuit, as defined in claim 65, in which:
  said difference circuit has a cutoff frequency of less than about ten hertz.

67. An opto-isolator circuit for providing a DC isolated output signal in response to a variable input signal comprising:

a primary side including:
  a light emitting source emitting light in response to a signal applied to said source; and
  a fixed bias generator generating a fixed bias signal to be added to the variable input signal for application to said light emitting source; and
a secondary side including:
  a two-leaded photodetector having an output responsive to said light emitting source for providing an output signal related to said fixed bias signal and the variable input signal by a scaling factor, the magnitude of said scaling factor being variable;
  a reference voltage generator providing a reference voltage; and
  control circuitry responsive to said reference voltage to ratiometrically compensate for said scaling factor such that said photodetector output is substantially independent of said scaling factor, said control circuitry including a difference circuit responsive to said photodetector output and said reference voltage to produce an output proportional to the difference between said photodetector output and said reference voltage and a controllable conductance having a first terminal responsive to said photodetector and a second terminal controlling the conductance responsive to said difference circuit output, and wherein said controllable conductance has a third terminal, said third terminal being held at a reference level greater than said reference voltage.

68. An opto-isolator circuit for providing a DC isolated output signal in response to a variable input signal comprising:
a primary side including:
  a light emitting source emitting light in response to a signal applied to said source; and
  a fixed bias generator generating a fixed bias signal to be added to the variable input signal for application to said light emitting source; and
a secondary side including:
  a two-leaded photodetector having an output responsive to said light emitting source for providing an output signal related to said fixed bias signal and the variable input signal by a scaling factor, the magnitude of said scaling factor being variable;
  a reference voltage generator providing a reference voltage; and
  control circuitry responsive to said reference voltage to ratiometrically compensate for said scaling factor such that said photodetector output is substantially independent of said scaling factor, said control circuitry including an integrator responsive to said photodetector.

69. The circuit of claim 68, wherein said integrator has a cutoff frequency of less than about ten hertz.

70. An opto-isolator circuit for providing a DC isolated output signal in response to a variable input signal comprising:
a primary side including:
  a light emitting source emitting light in response to a signal applied to said source; and
  a fixed bias generator generating a fixed bias signal to be added to the variable input signal for application to said light emitting source; and
a secondary side including:
  a two-leaded photodetector having an output responsive to said light emitting source for providing an output signal related to said fixed bias signal and the variable input signal by a scaling factor, the magnitude of said scaling factor being variable;
  a reference voltage generator providing a reference voltage; and
  control circuitry responsive to said reference voltage to ratiometrically compensate for said scaling factor such that said photodetector output is substantially independent of said scaling factor, wherein said photodetector has a DC level output and said control circuitry comprises:
    a first circuit having an input coupled to said photodetector and a first circuit output, said first circuit output being proportional to twice the DC level plus an AC component proportional to the variable input signal; and
    a second circuit coupled in feedback with said first circuit to control the DC voltage across said first circuit.

71. The circuit of claim 70, wherein said first circuit comprises an operational amplifier having inverting and noninverting inputs along with an output and a FET coupled between said inverting input and said output and said FET having a control electrode.

72. The circuit of claim 71, wherein said second circuit comprises a low pass filter responsive to said output of said operational amplifier and said control electrode of said FET being responsive to said filter.

73. The circuit of claim 70, wherein said photodetector has an output voltage swing and said first and second circuits have a gain that substantially cancels said output voltage swing of said photodetector, thereby increasing a frequency bandwidth of said opto-isolator circuit.

74. The circuit of claim 70, wherein said control circuitry includes a reference voltage generator providing two reference voltages, a first of said reference voltages being approximately equal to half of a second reference voltage, said first reference voltage being approximately equal to the DC voltage generated across said photodetector, and wherein said first circuit includes a first difference circuit to determine the difference between said first reference voltage and said photodetector output; and
  said second circuit includes a second difference circuit to provide at said output of said second circuit a signal proportional to the DC difference between said output of said first circuit and said second reference voltage.

75. The circuit of claim 74, wherein said first circuit includes a FET coupled between said input and said output of said first circuit such that said FET adds a DC voltage approximately equal to said second voltage to said output of said first difference circuit.

76. The circuit of claim 70, wherein said second circuit comprises an integrator having a cutoff frequency of about ten hertz.

77. An opto-isolator circuit for providing a DC isolated output signal in response to a variable input signal comprising:
a primary side including:
  a light emitting source emitting light in response to a signal applied to said source; and
  a fixed bias generator generating a fixed bias signal to be added to the variable input signal for application to said light emitting source; and
a secondary side including:
  a two-leaded photodetector having an output responsive to said light emitting source for providing an output signal related to said fixed bias signal and the variable input signal by a scaling factor, the magnitude of said scaling factor being variable;

a reference voltage generator providing a reference voltage; and control circuitry responsive to said reference voltage to ratiometrically compensate for said scaling factor such that said photodetector output is substantially independent of said scaling factor, said control circuit further comprising:

a current mirror having a mirror current input responsive to said output of said photodetector and providing a mirror current output which mirrors the signal provided by said photodetector;

a controllable resistance coupled to said mirror current output; and an integrator responsive to said reference voltage and voltage generated across said controllable resistance to provide said ratiometric compensation.

78. The circuit of claim 77, wherein said current mirror further includes emitter resistances for adjusting a ratio of the current at said input and said output of said current mirror.

79. The circuit of claim 77, wherein said integrator compares a voltage at said output of said current mirror with a fixed reference voltage.

80. An opto-isolator circuit for providing a DC isolated output signal in response to a variable input signal comprising:

a primary side including:

a light emitting source emitting light in response to a signal applied to said source; and a fixed bias generator generating a fixed bias signal to be added to the variable input signal for application to said light emitting source; and a secondary side including:

a two-leaded photodetector having an output responsive to said light emitting source for providing an output signal related to said fixed bias signal and the variable input signal by a scaling factor, the magnitude of said scaling factor being variable;

a reference voltage generator providing a reference voltage; and control circuitry responsive to said reference voltage to ratiometrically compensate for said scaling factor such that said photodetector output is substantially independent of said scaling factor, and wherein said primary side further comprises an input signal in series with said light emitting source and said bias generator, said bias generator comprising a current source.

81. A method for providing DC isolation between an input signal having an AC component supplied to a light emitting device and an output signal having a DC component and an AC component supplied by an output of a two-leaded photodetector, said photodetector optically coupled to said light emitting device by a variable scaling factor, said method comprising:

providing a fixed bias signal to said light emitting device to provide a fixed bias voltage to said photodetector; and controlling said DC component of said output of said photodetector with respect to said fixed bias voltage, wherein said AC component of said output signal varies with said input signal and is substantially independent of the scaling factor, and wherein the controlling step comprises forcing a fixed DC voltage across said photodetector.

82. The method of claim 81, wherein the forcing of said DC voltage comprises determining the difference between the DC voltage across said photodetector and a fixed voltage.

83. The method of claim 82, wherein said difference controls the conductance of a variable impedance device such that the DC voltage across said photodetector is fixed.

84. A method for providing DC isolation between an input signal having an AC component supplied to a light emitting device and an output signal having a DC component and an AC component supplied by an output of a two-leaded photodetector, said photodetector optically coupled to said light emitting device by a variable scaling factor, said method comprising:

providing a fixed bias signal to said light emitting device to provide a fixed bias voltage to said photodetector; and controlling said DC component of said output of said photodetector with respect to said fixed bias voltage, wherein said AC component of said output signed varies with said input signal and is substantially independent of the scaling factor; wherein said method additionally comprises:

adding a DC voltage to said photodetector output signal to create a summed voltage at a summed node;

determining the DC voltage difference between said summed voltage and a fixed reference voltage; and controlling the DC voltage to be added to said voltage across said photodetector.

85. A method for providing DC isolation between an input signal having an AC component supplied to a light emitting device and an output signal having a DC component and an AC component supplied by an output of a two-leaded photodetector, said photodetector optically coupled to said light emitting device by a variable scaling factor, said method comprising:

providing a fixed bias signal to said light emitting device to provide a fixed bias voltage to said photodetector; and controlling said DC component of said output of said photodetector with respect to said fixed bias voltage, wherein said AC component of said output signal varies with said input signal and is substantially independent of the scaling factor and wherein said photodetector produces an output current, said method further including:

mirroring said current from said photodetector;

providing said mirrored current to a controllable resistance; and controlling the resistance of said controllable resistance such that said current output is substantially independent of the scaling factor.

86. The method of claim 85, wherein said method of controlling said controllable resistance includes comparing a voltage developed across said controllable resistance with a preset voltage and integrating said comparison to set the resistance of said controllable resistance.

87. An opto-isolator circuit for providing a DC isolated output signal in response to a variable input signal comprising:

a primary side including:

a light emitting source emitting light in response to a signal applied to said source; and a fixed bias generator generating a fixed bias signal to be added to the variable input signal for application to said light emitting source;

and a secondary side including:
- a phototransistor having a collector terminal for providing an output signal responsive to said light emitting source, said output signal being related to said fixed bias signal and the variable input signal by a scaling factor, the magnitude of said scaling factor being variable;
- a reference voltage generator providing a reference voltage; and
- control circuitry coupled to said collector terminal, said control circuitry being responsive to said reference voltage to ratiometrically compensate for said scaling factor such that said phototransistor output is substantially independent of said scaling factor, and wherein said control circuitry includes:
  - a difference circuit responsive to said phototransistor output signal and said reference voltage to produce an output proportional to the difference between said phototransistor output signal and said reference voltage; and
  - a controllable conductance having a first terminal responsive to said phototransistor output signal and a second terminal controlling the conductance responsive to said difference circuit output, and wherein said difference circuit has a cutoff frequency of less than about one hundred hertz.

88. An opto-isolator circuit, as defined in claim 87, in which:
said difference circuit has a cutoff frequency of less than about ten hertz.

89. An opto-isolator circuit for providing a DC isolated output signal in response to a variable input signal comprising:
a primary side including:
- a light emitting source emitting light in response to a signal applied to said source; and
- a fixed bias generator generating a fixed bias signal to be added to the variable input signal for application to said light emitting source; and
a secondary side including:
- a phototransistor having a collector terminal for providing an output signal responsive to said light emitting source, said output signal being related to said fixed bias signal and the variable input signal by a scaling factor, the magnitude of said scaling factor being variable;
- a reference voltage generator providing a reference voltage; and
- control circuitry coupled to said collector terminal, said control circuitry being responsive to said reference voltage to ratiometrically compensate for said scaling factor such that said phototransistor output is substantially independent of said scaling factor, and wherein said control circuitry includes:
  - a difference circuit responsive to said phototransistor output signal and said reference voltage to produce an output proportional to the difference between said phototransistor output signal and said reference voltage; and
  - a controllable conductance having a first terminal responsive to said phototransistor output signal and a second terminal controlling the conductance responsive to said difference circuit output, and wherein said controllable conductance has a third terminal, said third terminal being held at a reference level greater than said reference voltage.

90. An opto-isolator circuit for providing a DC isolated output signal in response to a variable input signal comprising:

a primary side including:
- a light emitting source emitting light in response to a signal applied to said source; and
- a fixed bias generator generating a fixed bias signal to be added to the variable input signal for application to said light emitting source; and
a secondary side including:
- a phototransistor having a collector terminal for providing an output signal responsive to said light emitting source, said output signal being related to said fixed bias signal and the variable input signal by a scaling factor, the magnitude of said scaling factor being variable;
- a reference voltage generator providing a reference voltage; and
- control circuitry coupled to said collector terminal, said control circuitry being responsive to said reference voltage to ratiometrically compensate for said scaling factor such that said phototransistor output is substantially independent of said scaling factor, and wherein said control circuitry includes an integrator responsive to said phototransistor output signal.

91. The circuit of claim 90, wherein said integrator has a cutoff frequency of less than about ten hertz.

92. An opto-isolator circuit for providing a DC isolated output signal in response to a variable input signal comprising:
a primary side including:
- a light emitting source emitting light in response to a signal applied to said source; and
- a fixed bias generator generating a fixed bias signal to be added to the variable input signal for application to said light emitting source; and
a secondary side including:
- a phototransistor having a collector terminal for providing an output signal responsive to said light emitting source, said output signal being related to said fixed bias signal and the variable input signal by a scaling factor, the magnitude of said scaling factor being variable;
- a reference voltage generator providing a reference voltage; and
- control circuitry coupled to said collector terminal, said control circuitry being responsive to sail reference voltage to ratiometrically compensate for said scaling factor such that said phototransistor output is substantially independent of said scaling factor, wherein said phototransistor has a DC level output and said control circuitry comprises:
  - a first circuit having an input coupled to said phototransistor and a first circuit output, said first circuit output being proportional to twice the DC level plus an AC component proportional to the variable input signal; and
  - a second circuit coupled in feedback with said first circuit to control the DC voltage across said first circuit.

93. The circuit of claim 92, wherein said first circuit comprises an operational amplifier having inverting and noninverting inputs along with an output and a FET coupled between said inverting input and said output and said FET having a control electrode.

94. The circuit of claim 93, wherein said second circuit comprises a low pass filter responsive to said output of said operational amplifier and said control electrode of said FET being responsive to said filter.

95. The circuit of claim 92, wherein said phototransistor has an output voltage swing and said first and second circuits have a gain that substantially cancels said output voltage swing of said phototransistor, thereby increasing a frequency bandwidth of said opto-isolator circuit.

96. The circuit of claim 92, wherein said control circuitry includes a reference voltage generator providing two reference voltages, a first of said reference voltages being approximately equal to half of a second reference voltage, said first reference voltage being approximately equal to the DC voltage generated across said phototransistor, and wherein said first circuit includes a first difference circuit to determine the difference between said first reference voltage and said phototransistor output; and said second circuit includes a second difference circuit to provide at said output of said second circuit a signal proportional to the DC difference between said output of said first circuit and said second reference voltage.

97. The circuit of claim 96, wherein said first circuit includes a FET coupled between said input and said output of said first circuit such that said FET adds a DC voltage approximately equal to said second voltage to said output of said first difference circuit.

98. The circuit of claim 92, wherein said second circuit comprises an integrator having a cutoff frequency of about ten hertz.

99. An opto-isolator circuit for providing a DC isolated output signal in response to a variable input signal comprising:
  a primary side including:
    a light emitting source emitting light in response to a signal applied to said source; and
    a fixed bias generator generating a fixed bias signal to be added to the variable input signal for application to said light emitting source; and
  a secondary side including:
    a phototransistor having a collector terminal for providing an output signal responsive to said light emitting source, said output signal being related to said fixed bias signal and the variable input signal by a scaling factor, the magnitude of said scaling factor being variable;
    a reference voltage generator providing a reference voltage; and
    control circuitry coupled to said collector terminal, said control circuitry being responsive to said reference voltage to ratiometrically compensate for said scaling factor such that said phototransistor output is substantially independent of said scaling factor, and wherein said control circuit further comprises:
      a current mirror having a mirror current input responsive to said output of said phototransistor and providing a mirror current output which mirrors the signal provided by said phototransistor;
      a controllable resistance coupled to said mirror current output; and
      an integrator responsive to said reference voltage and voltage generated across said controllable resistance to provide said ratiometric compensation.

100. The circuit of claim 99, wherein said current mirror further includes emitter resistances for adjusting a ratio of the current at said input and said output of said current mirror.

101. The circuit of claim 99, wherein said integrator compares a voltage at said output of said current mirror with a fixed reference voltage.

102. A method for providing DC isolation between an input signal having an AC component supplied to a light emitting device and an output signal having a DC component and an AC component supplied by an output of a phototransistor, said phototransistor having a collector terminal for providing said output signal, said phototransistor being optically coupled to said light emitting device by a variable scaling factor, said method comprising:
  providing a fixed bias signal to said light emitting device to provide a fixed bias voltage to said phototransistor; and
  controlling said DC component of said output of said phototransistor with respect to said fixed bias voltage, wherein said AC component of said output signal varies with said input signal and is substantially independent of the scaling factor, and wherein the controlling step comprises forcing a fixed DC voltage across said phototransistor.

103. The method of claim 102, wherein the forcing of said DC voltage comprises determining the difference between the DC voltage across said phototransistor and a fixed voltage.

104. The method of claim 103, wherein said difference controls the conductance of a variable impedance device such that the DC voltage across said phototransistor is fixed.

105. A method for providing DC isolation between an input signal having an AC component supplied to a light emitting device and an output signal having a DC component and an AC component supplied by an output of a phototransistor, said phototransistor having a collector terminal for providing said output signal, said phototransistor being optically coupled to said light emitting device by a variable scaling factor, said method comprising:
  providing a fixed bias signal to said light emitting device to provide a fixed bias voltage to said phototransistor; and
  controlling said DC component of said output of said phototransistor with respect to said fixed bias voltage, wherein said AC component of said output signal varies with said input signal and is substantially independent of the scaling factor, and wherein said method additionally comprises:
    adding a DC voltage to said phototransistor output signal to create a summed voltage at a summed node;
    determining the DC voltage difference between said summed voltage and a fixed reference voltage; and
    controlling the DC voltage to be added to said voltage across said phototransistor.

106. A method for providing DC isolation between an input signal having an AC component supplied to a light emitting device and an output signal having a DC component and an AC component supplied by an output of a phototransistor, said phototransistor having a collector terminal for providing said output signal, said phototransistor being optically coupled to said light emitting device by a variable scaling factor, said method comprising:
  providing a fixed bias signal to said light emitting device to provide a fixed bias voltage to said phototransistor; and
  controlling said DC component of said output of said phototransistor with respect to said fixed bias voltage, wherein said AC component of said output signal varies with said input signal and is substantially independent of the scaling factor, and wherein said phototransistor produces an output current, said method further including:
    mirroring said current from said phototransistor;
    providing said mirrored current to a controllable resistance; and controlling the resistance of said controllable resistance such that said current output is substantially independent of the scaling factor.

107. The method of claim 106, wherein said method of controlling said controllable resistance includes comparing a voltage developed across said controllable resistance with a preset voltage and integrating said comparison to set the resistance of said controllable resistance.

* * * * *